United States Patent [19]

Ito et al.

[11] Patent Number: 4,487,180
[45] Date of Patent: Dec. 11, 1984

[54] ENGINE WITH A ROTARY-SPEED CONTROL APPARATUS AND AN EMERGENCY HALT APPARATUS

[75] Inventors: Ryoichi Ito, Sakai; Osamu Murakami, Nara; Masayuki Nakamura, Sakai; Kazuo Higo, Sakai; Kengi Ueno, Sakai, all of Japan

[73] Assignee: Kubota, Ltd., Osaka, Japan

[21] Appl. No.: 554,152

[22] Filed: Nov. 21, 1983

[30] Foreign Application Priority Data

Oct. 22, 1983 [JP] Japan .................... 58-175918

[51] Int. Cl.³ ............................... F02D 17/04
[52] U.S. Cl. ........................ 123/333; 123/41.15; 123/198 D; 123/198 DB
[58] Field of Search ............ 123/198 D, 198 DB, 332, 123/333, 340, 397, 41.15

[56] References Cited

U.S. PATENT DOCUMENTS

| | | | |
|---|---|---|---|
| 3,841,291 | 10/1974 | Ludewig et al. | 123/198 DB |
| 4,080,946 | 3/1978 | Cunningham | 123/198 D |
| 4,106,470 | 8/1978 | Saizar | 123/198 DB |
| 4,388,900 | 6/1983 | Hoshi | 123/198 DB |
| 4,391,241 | 7/1983 | Dohshita et al. | 123/198 DB |

Primary Examiner—William A. Cuchlinski, Jr.
Attorney, Agent, or Firm—Jordan and Hamburg

[57] ABSTRACT

An engine has a load detector, or more specifically a threshold load comparator, and also detectors for sensing any abnormality of various factors influencing the normal engine operation. When no abnormality is sensed, the engine is made to operate automatically at a low speed level when the engine load is below the threshold value, and at a high speed level when the load is beyond such value. When any abnormality is sensed, then the engine is emergently halted in a fail-safe manner, thus any damaging disorder in controling circuitry for effecting such emergent halting leads in itself to emergent halting of the engine as well.

7 Claims, 10 Drawing Figures

Fig. 1 *PRIOR ART*

ENGINE WITH A ROTARY-SPEED CONTROL APPARATUS AND AN EMERGENCY HALT APPARATUS

BACKGROUND OF THE INVENTION

This invention relates to an engine provided with a rotary-speed control apparatus and an emergency halt apparatus.

Meant here by the rotary-speed control apparatus is such an apparatus that is installed in the intension of saving fuel from unnecessary consumption and accordingly abating the engine noise; by means of automatically lowering down the engine speed, when no substantial load acts on the engine, from a high-speed rotation for the normal working operation to a low-speed rotation for such idling operation; while automatically restoring the engine to the normal working operation, when the load beyond a preset threshold value has again acted on the engine.

On the other hand, meant by the emergency halt apparatus is such an apparatus that is installed in the intention of preventing damage of the engine, as seizure or the like, by means of mergently halting the engine in response to detecting any abnormality of various factors influencing the normal engine operation, for instance as abnormal lowering down of the lubricant oil pressure and abnormal rising up of the cooling water temperature.

More specifically, this invention relates to an engine having as its prerequisite to this invention the construction of the ancillary apparatuses basically prevailing in every engine shown in either one of FIGS. 1, 2 and 9, as follows:

Thus, the engine 1 is provided with the rotary-speed control apparatus 2 and the emergency halt apparatus 3, such that:

the rotary-speed control apparatus 2 comprises:
  a load detection circuit 4,
  a rotary-speed control circuit 5 and
  a rotary-speed switchover actuator 6,
  which are connected one after another in this sequential order,
  and
functions so as to maneuver an acceleration lever 7, by means of the rotary-speed switchover actuator 6:
  into a high-speed rotation position 8 when the engine 1 is in a state of loaded operation,
    which state is detected by the load detection apparatus 4 and is communicated to the rotary-speed control circuit 5,
  and
  into a low-speed rotation position 9 when the engine 1 is in a state of no-load operation, which state is detected and communicated in the same manner as mentioned above; and
the emergency halt apparatus 3 comprises:
  an abnormality detection apparatus 11,
  an emergent halt control circuit 12 and
  an engine-halt actuator 13,
  which are connected one after another in this sequential order,
  and
functions so as to halt operation of the engine 1 by means of the engine-halt actuator 13, in response to occurrence of any abnormality in the engine 1, which occurrence is detected by the abnormality detection apparatus 11 and communicated to the emergent halt control circuit 12.

Shown in FIG. 1 is a typical example of the conventional construction of the rotary-speed control apparatus and the emergency halt apparatus for the engine of the above-mentioned type.

As seen, the rotary-speed control apparatus 2 and the emergency halt apparatus 3 are annexed to the engine 1, independently of each other.

The accelerator lever 7 is urged into the high-speed rotation position 8 by means of a high-speed biasing spring 14, and is driven thereagainst in switchover into the low-speed rotation position 9 by means of the rotary-speed switchover actuator 6. Shown at 15 is an engine-halt lever, and it is urged into an engine-operating position a by means of a halt-releasing spring 16, and is driven thereagainst into an engine-halting position b by means of the engine-halt actuator 13.

The rotary-speed control circuit 5 and the emergent halt control circuit 12 are connected, independently of each other, to a battery electric power source 17 as well as a generator 18 which is an accessory part to the engine 1.

Shown at 19 is a main switch, at 20 is a timer, at 21 is a generator driven by the engine, at 22 is (are) load appliance(s), and at 23 is a manual low-speed-setting lever.

FIG. 1 shows the state with the engine 1 at a standstill.

Function of the apparatuses of the above construction is now described hereunder. In the illustrated state, the main switch 19 is at an OFF position c, and so neither the rotary-speed control apparatus 2 nor the emergency halt apparatus 3 is supplied with electric power. In this consequence, the accelerator lever 7 is held as maneuvered into the high-speed rotation position 8 by means of the high-speed-biasing spring 14, and the engine-halt lever 15 is held as maneuvered into the engine-operating position a by means of the halt-releasing spring 16.

By switching over the main switch 19 in the sequential order of a preheating position d, a starter position e and an ON position f, while manually maneuvering the accelerator lever 7 into the low-speed rotation position 9 by means of the manual low-speed-setting lever 23, there starts the engine 1 by means of a non-illustrated self-starter. After the starting, the generator 18 is driven by the engine 1 at a sufficient speed as to start generating electricity to give sufficient triggering base petentials to transistors 26,27 of the rotary-speed control circuit 5 and the emergent halt control circuit 12, respectivelly. The transistor 26 thus turns ON and makes ON a relay 28. Accordingly, the rotary-speed switchover actuator 6 is energized and moves rightwards as shown by an arrow in FIG. 1, thus to retain the accelerator lever 7 in the low-speed rotation position 9. Hereafter, the operator may release the manual low-speed-setting lever 23.

When there acts no load on the engine 1, it then is truly the case, as mentioned just above, that as the transistor 26 turns ON because of the triggering base vlotage, it makes ON the relay 28, causes the rotary-speed switchover actuator 6 to move rightwards, displaces the accelerator lever 7 into the low-speed rotation position 9, and causes the engine 1 to operate in a low-speed rotation.

However, if there acts the load on the engine 1, then the load detection apparatus 4 emits a load-detection signal sufficient enough to act as triggering base potential of a transistor 29 which is thus thereby turned ON and which then in turn substantially grounds the base potential of the transistor 26 and therefore turns OFF sequentially the transistor 26, the relay 28 and the rotary-speed switchover actuator 6. Then, the accelerator lever 7 is maneuvered into the high-speed rotation position 8 by means of the high-speed-biasing spring 14, and it causes the engine 1 to operate in a high-speed rotation.

All what is stated hereinabove is the function as proceeds under normal operation of the engine 1, but on the other hand if abnormality occurs during operation of the engine, then the abnormality detection apparatus 11 turns ON. Hereupon, the transistor 27, supplied with the sufficient triggering base potential as has been described hereinabove, is turned ON concurrently with a relay 30 which in turn causes the engine-halt actuator 13 to move rightwards as shown by an arrow in FIG. 1, thus to maneuver the engine-halt lever 15 into the engine-halting position b and therefore to cause the engine 1 to halt.

Besides, if the main switch 19 is maneuvered into the OFF position c, then the timer 20 is energized and kept ON for a set period, to thereby cause the engine-halt actuator 13 to move rightwards during such set period and therefore to cuase the engine 1 to halt. Upon lapsing of the set period, the timer 20 breaks OFF and therefore blocks the power supply to the engine-halt actuator 13, thus to prevent the actuator 13 from burning out.

With this conventional structure, there are following drawbacks:

In the case there occurs any damage or disorder in the emergent halt control circuit 12, for instance as the breaking damage of the transistor 27 in that circuit 12 or of lead wires 24 connecting to the transistor 27, then the relay 30 fails to make ON even if there has occurred any abnormality at the engine 1, as abnormal lowering down of the lubricant oil pressure, abnormal rising up of the cooling water temperature, or the like, and even if the abnormality detection apparatus 11 turns ON in due response to such abnormality. Because of such failure in the intended operation of the relay 30, the engine-halt actuator 13 can not be actuated, and the engine 1 can not then be emergently halted.

In this consequence, the engine 1 then continues operation in spite that the above-mentioned abnormality has occurred, and may therefore get broken, for instance as being burnt out on account of the failure of lubrication, cooling and the like.

Besides the operator is required to effect complicated maneuvering at the time of the starting up of the engine 1, namely, to manually maneuver the main switch 19 in sequential switchover, while concurrently maneuvering the accelerator lever 7 forcibly into the low-speed rotation position 9 by means of the manual low-speed-setting lever 23.

SUMMARY OF THE INVENTION

This invention, as shown in FIG. 2 or 9, has as its object to prevent the engine form causing any damaging accident such as burning out or the like, by fail-safely disabling the engine from starting up or by halting same, in the case the emergent halt control circuit 12 has come to disorder as described above, by means of then automatically disabling the rotary-speed control apparatus 2 and having the engine-halt actuator 13 yet function to cause the emergent halting, namely to maneuver the accelerator lever 7 into an engine-halting position 10.

In order to attain the above object, this invention has the construction as shown by way of example in FIG. 2 or 9, namely such that:

a restoring spring 39, the engine-halt actuator 13 and the rotary-speed switchover actuator 6 are interlockedly connected to the accelerator lever 7, in such a manner that the accelerator lever 7 is amneuvered:

into an engine-halting position 10 as is resiliently urged there by means of the restoring spring 39, when both the actuators 6,13 are left deenergized, into the low-speed rotation position 9, when only the engine-halt actuator 13 alone is energized, and into the high-speed rotation position 8, when both the actuators 6,13 are energized together;

the rotary-speed control circuit 5 of the rotary-speed control apparatus 2 is connected to an electric power source 33 via:

an electric wire 31 or 32 and the emerbent halt control circuit 12 of the emergency halt apparatus 3, in such a manner that:

the electirc power supply is effected from the power source 33 to the rotary-speed control circuit 5 through the emergent halt control circuit 12, when the emergent halt control circuit 12 is in the normal actuation state, thus to retain the rotary-speed control circuit 5 in the actuation state, the accelerator lever 7 is maneuvered by restoring spring 39, into he engine-halting position 10, thus to halt the engine 1, when the emergent halt control circuit 5 is not in the normal actuation state, on account of then blockingly halting the electirc supply from the emergent halt control circuit 12:

on the one hand to the engine-halt actuator 13, and on the other hand to the rotary-speed control circuit 5 and therefore also to the rotary-speed switchover actuator 6; and a control input line 64 of the emergent halt control circuit 12 of the emergency halt apparatus 3 is connected to the power source 33 parallelly via:

an ON position 38 and a starter position 37 of a main switch 34;

in such a manner that the accelerator lever 7 is automatically maneuvered into the low-speed rotation position 9, when the main switch 34 is maneuvered into the starter position 37 to thus provide the engine-starting state, on account that:

the emergent halt control circuit 12 then gets the electric supply from the control input line 64 and thus energizingly actuates the engine-halt actuator 13, and the rotary-speed control circuit 5 then gets the electric supply through the emergent halt control circuit 12 but, in view of no load-signal being emitted from the load detection apparatus 4, blocks energization of and therefore halts the rotary-speed switchover actuator 6.

Function of the apparatus of this invention of the above construction is now described hereunder:

FIG. 2 as well as FIG. 9 shows the state with the engine 1 at a standstill. In the illustrated state, the main switch 34 is at an OFF position 35, and so neither the rotary-speed control apparatus 2 nor the emergency halt apparatus 3 is supplied with electric power. In this consequence, the accelerator lever 7 is held as maneuvered into the engine-halting position 10 by means of the restoring spring 39.

By switching over the main switch 34 in the sequential order of a preheating position 36, the starter position 37 and the ON position 38; the rotary-speed control apparatus 2 and the emergency halt apparatus 3 are supplied with the electric power and thus come to the operating state, namely a sufficient triggering base potential is given to a switching transistor 41 of the emergent halt control circuit 12. The transistor 41 thus ON and makes ON a relay 42. Accordingly, the engine-halt actuator 13 is made ON and moves leftwards as shown by an arrow in FIG. 2 or 9, thus to maneuver the accelerator lever 7 from the engine-halting position 10 into the low-speed rotation position 9.

When there acts no load of load appliance(s) 47 on the engine 1 via a generator 46, then the load detection apparatus 4 emits no load detection signals and so a switching transistor 43 of the rotary-speed control circuit 5 gets no triggering base potential. The transistor 43 is thus kept OFF and so a relay 44 is also kept OFF. Accordingly, the rotary-speed switchover actuator 6 is not actuated, either. Therefore, the accelerator lever 7, maneuvered into the low-speed rotation position 9 by means of the engine-halt actuator 13, is retained there and so the engine 1 is kept to operate a low-speed rotation.

If there acts the load on the engine 1, then the load detection apparatus 4 emits a load-detection signal sufficient enough to trigger the traisistor 43 which is thus thereby turned ON. Accordingly, the rotary-speed switchover actuator 6 is made ON and moves leftwards as shown by an arrow in FIG. 2 or 9, thus to maneuver the accelerator lever 7 from the low-speed rotation position 9 into the high-speed rotation positions 8 and so the engine 1 is caused to operate in a high-speed rotation.

All what is stated hereinabove is the function as proceeds under normal operation of the engine 1, but on the other hand if abnormality occurs during operation of the engine, then the abnormality detection apparatus 11 turns ON. This directly means to ground the base potential of the transistor 41 which is thus thereby turns OFF. Consequently, on the one hand, the relay 42 is broken OFF and so the engine-halt actuate 13 is deenergized. On the other hand, the power supply to the electric wire 31 or 32 is concurrently blocked and so the relay 44 is broken OFF and therefore the rotary-speed switchover actuator 6 is also deenergized. On account hereof, the accelerator lever 7 is maneuvered into the engine-halting position 10 by means of the restoring spring 39 and so the engine 1 is caused to halt.

Besides, if the main switch 34 is maneuvered into the OFF position 35, then the power supply to the rotary-speed control circuit 5 and the emergent halt control circuit 12 is blocked, thus the rotary-speed switchover actuator 6 and the engine-halt actuator 13 are both deenergized. On account hereof, the accelerator lever 7 is also in this way maneuvered into the engine-halting position 10 by means of the restoring spring 39 and so the engine 1 is caused to halt.

This invention, being constructed and functioning as described above, has the effects or merits as follows:

A. When the emergent halt control circuit 12 has caused disorder on account for instance that the switching transistor 41 of the emergent halt control circuit 12 gets damaged, that lead wires 45 connecting thereto have broken, or the like, then as the emergent halt control circuit 12 comes to halt its operation, it concurrently functions to block the electric supply to the rotary-speed control circuit 5 which is thus also disabled. On account hereof, the accelerator lever 7 is released both from the engine-halt actuator 13 and from the rotary-speed switchover actuator 6, and is thus restored into the engine-halting position 10 by means of the restoring spring 39, and the engine 1 is in such case caused to halt in a fail-safe manner.

Namely, it is hereby possible to dissolve the drawback of the conventional structure, of causing damaging accident as seizure and the like, in the case the emergent halt control circuit has come to disorder, on account that the engine continues operation failing to cause emergent halting in spite that abnormality has occurred, leaving the abnormality intact.

B. As the means for preventing the damaging accident on account of abnormal operation of the engine, it is sufficient only to provide such structure on the one hand as to interlockingly connect the restoring spring, the engine-halt actuator and the rotary-speed switchover actuator, to the accelerator lever, and on the other hand concurrently therewith to connect the rotary-speed control circuit of the rotary-speed control apparatus, via the emergent halt control circuit of the emergency halt apparatus, to the electric power source.

In consequence hereof, no watching apparatus for the specific use of detecting disorder of the emergent halt control circuit and of subjecting the engine to emergent halting in case of such detection is needed here, and it thus is possible to simplify the structure.

Yet more, it is possible to omit the engine-halt lever 15, halt-releasing spring 16 and the transmitting system therefor as used conventionally as shown in FIG. 1, to thus contributing to further simplifying the structure.

C. Needed for starting up the engine 1 is solely to maneuver the main switch 34 alone, thus without requiring the complex maneuvering, as in the case of the conventional structure shown in FIG. 1, namely of the main switch, referenced there as 19, and concurrently therewith also of the manual low-speed-setting lever 23.

Thus, when the main switch 34 is maneuvered into either one of the starter position 37 and the ON position 38, then power supply to the control input line 64 of the emergent halt control circuit 12 is effected, so the engine-halt actuator 13 is energized if there is no abnormality present, and therefore the accelerator lever 7 is then automatically manevered into the low-speed rotation position 9 so long as there acts no substantial load on the engine 1 as yet. This is the reason why the concurrent maneuvering of the manual low-speed setting lever 23 needed in the case of the conventional structure can now be omitted.

D. By maneuvering the main switch 34 into the OFF position 35, power supply to both the emergent halt control circuit 12 and the rotary-speed control circuit 5 is blocked, so both the engine-halt actuator 13 and the rotary-speed control actuator 6 are deenergized, and therefore the accelerator lever 7 is maneuvered into the engine-halt position 10 by means of the restoring spring 39, thus to cause the engine 1 to halt.

It is hereby possible to omit the timer 20 needed for such engine halting in the case of the conventional structure shown in FIG. 1.

Still other advantages according from this invention will become apparent from the detailed description to follow hereinbelow.

DESCRIPTION OF THE PREFERRED EMBODIMENTS

First, a primary preferred embodiment of this invention is described hereunder with reference to FIGS. 2 through 8.

Figure 5:
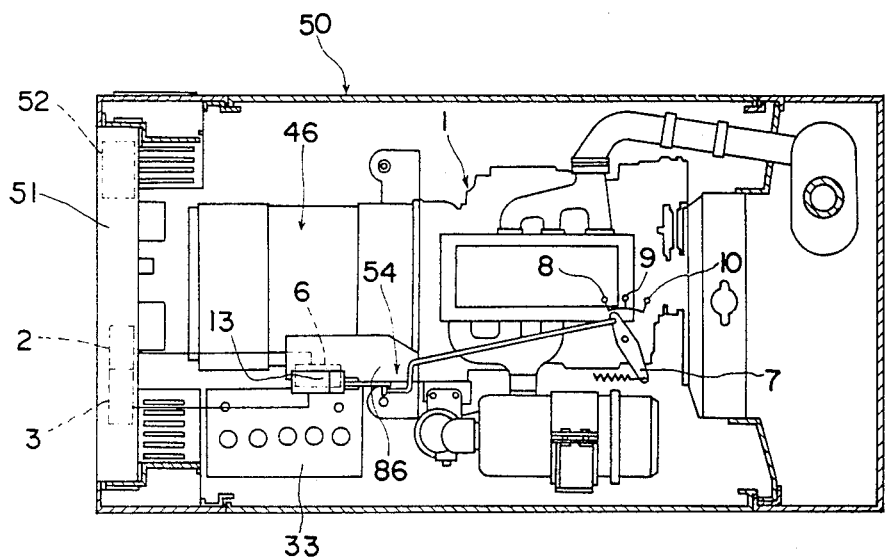
FIG. 5 is a schematic plan view, in horizontal section, of a soundproof type engined electric generator.
Figure 6:
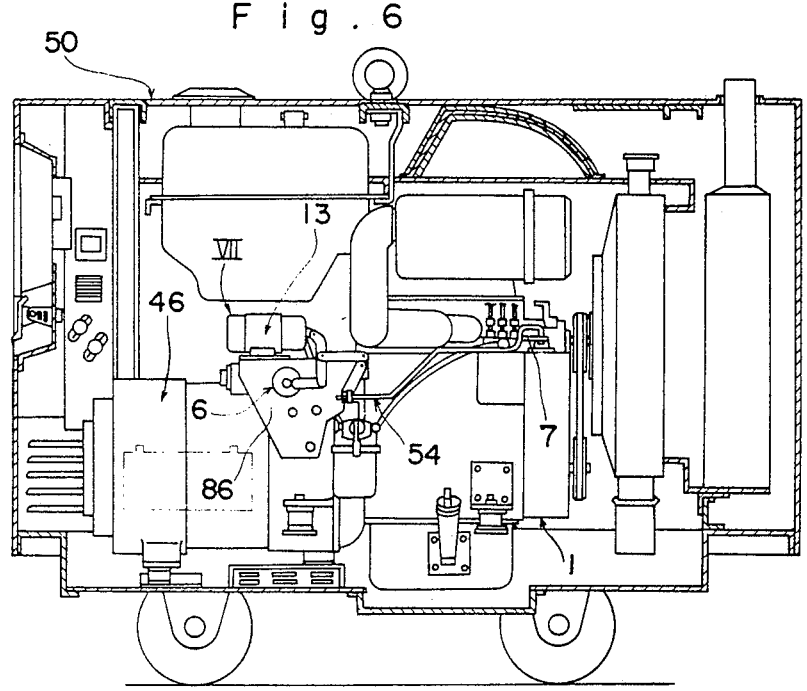
FIG. 6 is a partly-sectioned front view of the generator of FIG. 5.
Figure 7:
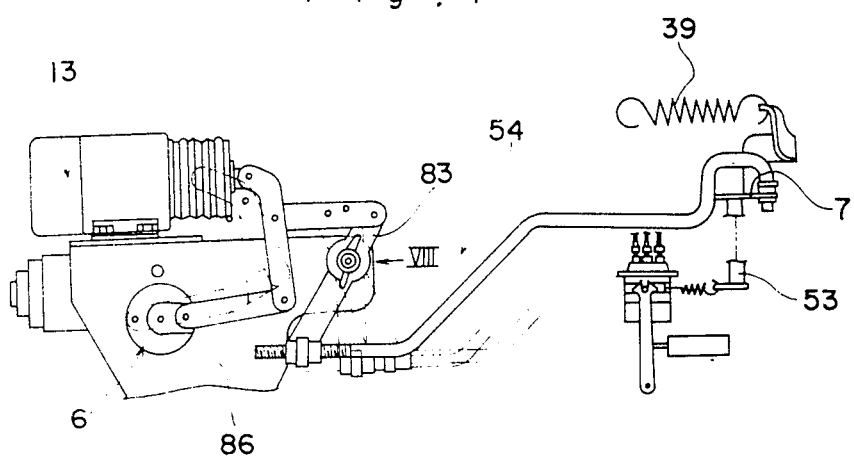
FIG. 7 is an enlarged view of portion VII of FIG. 6.
Figure 8:
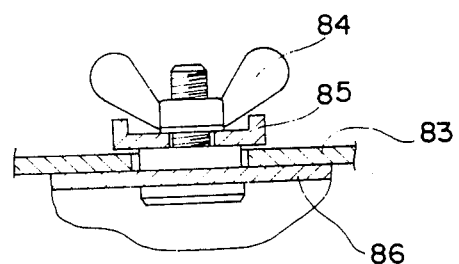
FIGS. 8(A)(B) are bottom views, in horizontal section, of portion VIII in FIG. 7.
Figure 8:
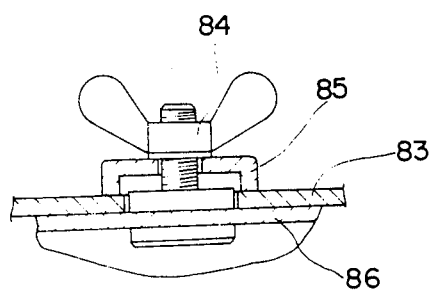

Shown in FIGS. 5 and 6 is an engined electric generator or an engined welder. This consists of a water-cooled upright type diesel engine 1, an electric generator 46, the battery 33, a control apparatus 51, the rotary-speed control apparatus 2 and the emergency halt apparatus 3, as are installed within a soundproof case 50. In the case of the engined welder, there further is installed an induction reactor 52 as well.

Figure 1:
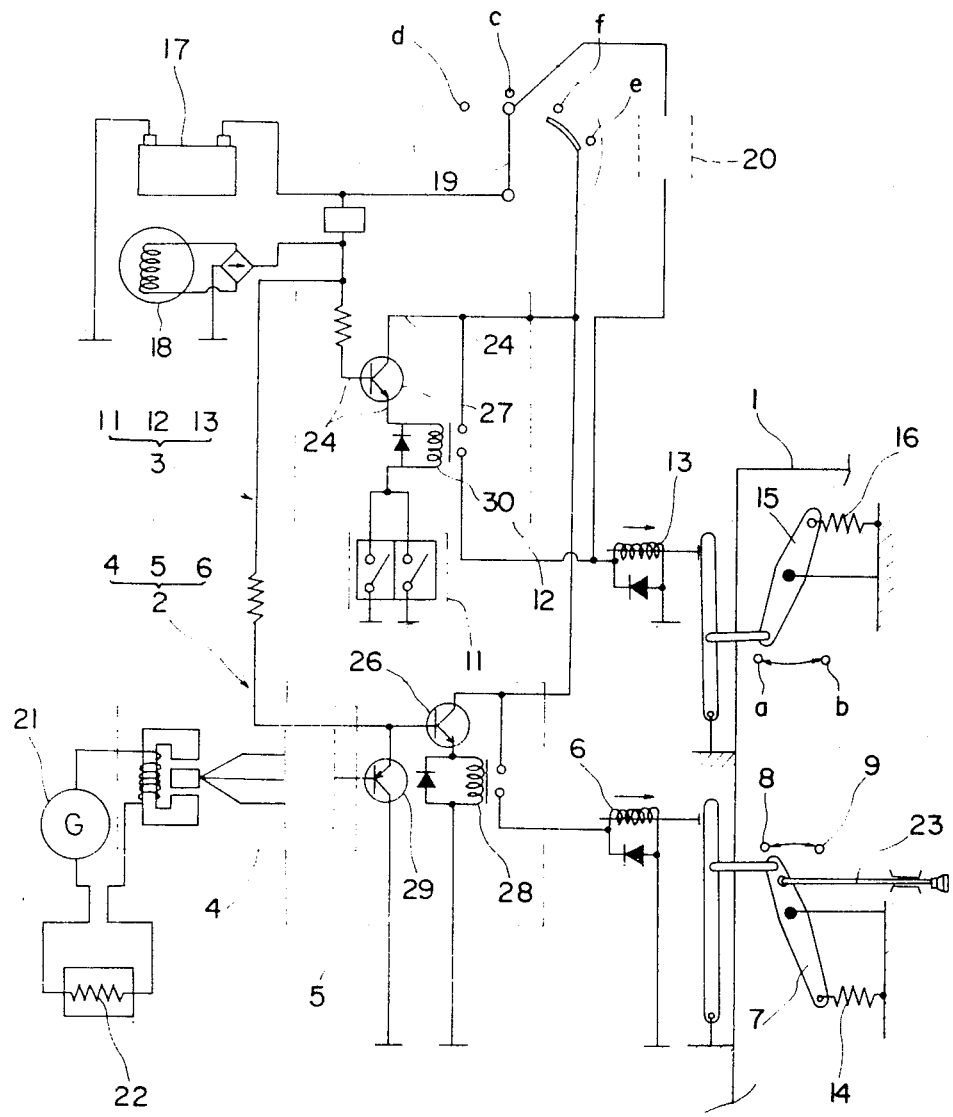
FIG. 1 is an electric circuit diagram of a typical example of the conventionally constructed overall rotary-speed control apparatus and emergency halt apparatus, while FIGS. 2 and subsequent thereto show embodiments of a rotary-speed control apparatus and an emergency halt apparatus according to this invention, thus
Figure 2:
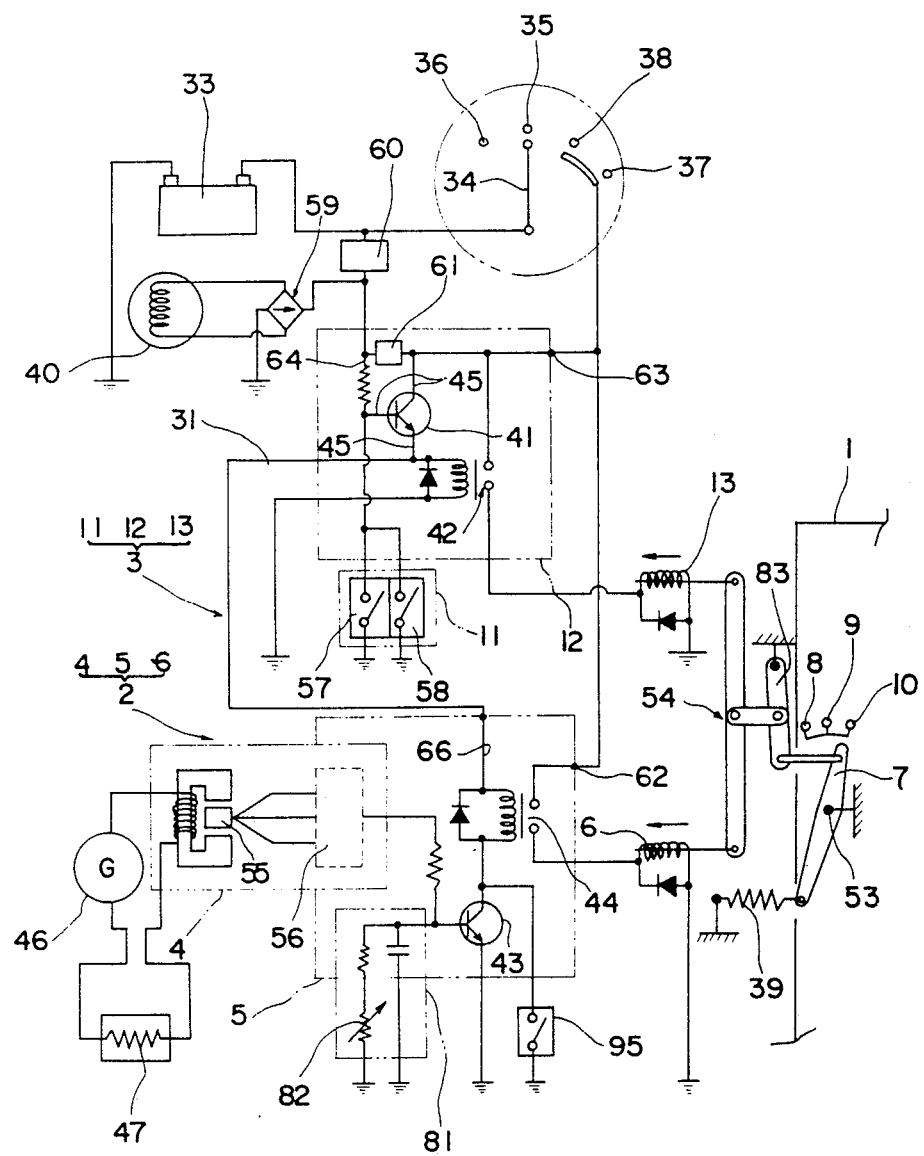
FIG. 2 is an electric circuit diagram of the overall apparatus.
Figure 3:
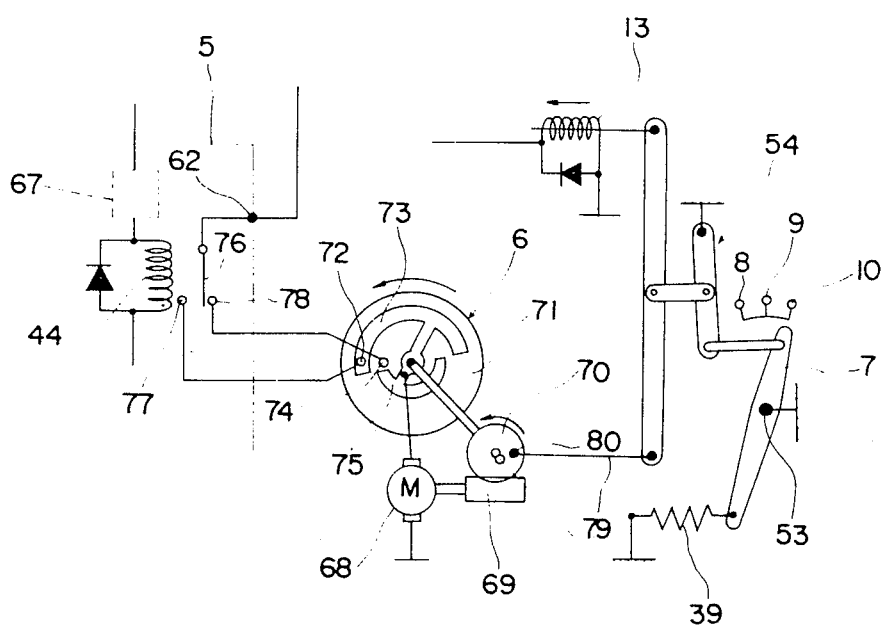
FIG. 3 is a combined illustration of an electric circuit and a mechanism, of a motored apparatus type rotary-speed switchover actuator.

As shown in FIGS. 2 and 3, the accelerator lever 7 of the engine 1 is pivotally supported on a fixed wall via a lever-shaft 53, and is resiliently urged by the restoring spring 39 towards the engine-halting position 10. However, if the emergency halt apparatus 3 is kept in its active operation state, then the accelerator lever 7 is switched over, via a link mechanism 54, into the low-speed rotation position 9 for the ilding engine operation when the rotary-speed control apparatus 2 is kept in its inactive state, and further into the high-speed rotation position 8 for the working engine operation when the rotary-speed control apparatus 2 is also brought into its active operation state.

FIG. 2 shows a typical circuitry of the rotary-speed control apparatus 2 and the emergency halt apparatus 3.

The rotary-speed control apparatus 2 comprises: the load detection apparatus 4; the rotary-speed control circuit 5; and the rotary-speed switchover actuator 6; as are interconnected one after another in this sequential order.

The load detection apparatus 4 is adapted to detect, when the electric power generated by the generator 46 has been consumed by the load appliance(s) 47, the consumed current by means of a Hall IC 55, and to give, as the output, the load detection signal from a signal generator 56.

The rotary-speed control circuit 5 is adapted to maneuver the accelerator lever 7 from the low-speed rotation position 9 into the high-speed rotation position 8, in response to the load detection signal as is given as the output from the load detection apparatus 4, in such a manner that the switching transistor 43 then turns ON and so the relay 44 makes ON and the thus the rotary-speed switchover actuator 6 makes ON and moves leftwards as shown by an arrow; while in the sate where no load detection signals are given, then to maneuver the accelerator lever 7 into the low-speed rotation position 9, in such a manner that the relay 44 and the actuator 6 then sequentially turn OFF and thus the actuator 6 is restored by the force of the restoring spring 30 to move back rightwards.

The emergency halt apparatus 3 comprises: the abnormality detection apparatus 11; the emergent halt control circuit 12; and the engine-halt actuator 13; as are interconnected one after another in this sequential order.

The abnormality detection apparatus 11 comprises, in turn, in this specific instance: an oil-pressure switch 57 which detects abnormal lowering down of the lubricant oil pressure of the engine 1; and a water temperature switch 58 which detects abnormal rising up of the cooling water temperature of the engine 1; as are parallelly interconnected. Both these switches 57,58 are of normally-open type, and turn ON in response to the abnormality detection, to thus bring up the ground potential.

The emergent halt control circuit 12 is adapted to maneuver the accelerator lever 7, as has been in the low-speed rotation position 9, into the engine-halting position 10, in response to the abnormality detection signal as is given as the output of either one of the switches 57,58 of the abnormality detection apparatus 11 makes ON, in such a manner that the switching transistor 41 then turns OFF and so the relay 42 breaks OFF and thus the engine-halt actuator 13 breaks OFF and therefore the actuator 13 is restored by the force of the restoring spring 39 to move back rightwards; while in the state where no abnormality signals are given, then to maneuver the accelerator 7 into the low-speed rotation position 9, in such a manner that the transistor 41, the relay 42 and the actuator 13 then sequentially turn ON and the actuator 13 moves leftwards as shown also by an arrow.

The resotoring spring 39, the engine-halt actuator 13 and therotary-speed switchover actuator 6 are interlockedly connected to the accelerator lever 7, in summary in such a manner that the accelerator lever 7 is maneuvered:

into the engine-halting position 10 as is resiliently urged there by means of the restoring spring 39, when both the actuators 6,13 are left deenergized;

into the low-speed rotation position 9, when only the engine-halt actuator 13 alone is energized; and into the high-speed rotation position 8, when both the actuators 6,13 are energized together.

A power input terminal 62 of the rotary-speed control circuit 5 and a power input terminal 63 of the emergent halt control circuit 12 are parellelly connected to the battery electric power source 33 via a starter position 37 and an ON position 38 of the main switch 34.

The control input line 64 of the emergent halt control circuit 12 is on the one hand connected to the electric power source 33 via: a timer 61 for the starting; the power input teminal 63; and a parallel circuit of the ON position 38 and the starter position 37 of the main switch 34; and is on the other hand connected to a generator 40 via a rectifier circuit 59. The generator 40 is an accessory to the engine 1, adapted to be driven by means of a non-illustrated fan-belt primarily for driving a radiator fan, and to charge, with the electric power generated thereby, the battery 33 through a regulator 60.

A control electric power input line 66 of the rotary-speed control circuit 5 is connected by means of the electric wire 31 to a junction of an output terminal of the transistor 41 and an input terminal of the relay 42, in the emergent halt control circuit 12. Thus, the control electric power input line 66 of the rotary-speed control circuit 5 is connected, via the electric wire 31 as well as the transistor 41 and the control input line 64, in the emergent halt control circuit 12, on the one hand to the electric power source via the main switch 34 and on the other hand to the generator 40.

Accordingly, the emergent halt control circuit 12 supplies the electric power, when it is in the normal operation state, from the battery 33 or the generator 40, then through the transistor 41 of the emergent halt control circuit 12, to the control electric power input line 66 of the rotary-speed control circuit 5, thus to thereby retain the rotary-speed control circuit 5 in its active operation state.

However, when the emergent halt circuit 12 is in a defective state, thus not in the normal operation, on account for instance of any breaking damage of the transistor 41 in that circuit 12 or of the lead wires which are indistinctively commonly designated as 45 but which are connected distinctly to the respective emitter, collector and base terminals of the transistor 41; the on the one hand the emergent halt control circuit 12 gets to operation-halting state and thus relay 42 and the actuator 13 break OFF, and on the other hand the power supply to the control electric power input terminal 66 of the rotary-speed control circuit 5 is concurrently blocked and so the rotary-speed control circuit 5 gets also to operation-halting state and thus the relay 44 and the actuator 6 break OFF as well, and in this consequence the accelerator lever 7 is maneuvered into the engine-halting position 10 by means of the force of the restoring spring 39, and it therefore causes the engine 1 to halt.

Besides, when the main switch 34 is maneuvered into the starter position 37 to thus provided the engine-starting state, then the accelerator lever 7 is automatically maneuvered into the low-speed rotation position 9, on account that:

the emergent halt control circuit 12 then gets the electric supply from the control input line 64 and thus energizingly actuates the engine-halt actuator 13, and the rotary-speed control circuit 5 then gets the electric supply through the emergent halt control circuit 12 but, in view of no load-signal being emitted from the load detection apparatus 4, brocks energization of and therefore halts the rotary-speed switchover actuator 6.

The timer 61 for the starting is adapted to make ON only for a certain set period after being put into operation, thus to break OFF upon starting up of the engine 1, as undergoing then the time out. It is hereby secured to supply the power to the control input line 64 of the emergent halt circuit 12, from the battery 33 substantially only during the engine-starting maneuvering process where the gnerator 40 does not generate sufficient electricity as yet, thus exclusively from the generator 40 since soon after fully starting up the engine 1 where it fully generates electricity. In this case, if the fan-belt driving the generator 40 breaks off, it then results in the complete failure of the power supply both to the control input line 64 of the emergent halt control circuit 12 and to the control input line 66 of the rotary-speed control circuit 5. Accordingly, both the actuators 6,13 are immediately deenergized, and thus the accelerator lever 7 is thereby maneuvered into the engine-halting position 10, to therefore cause the engine 1 to halt.

In the illustrated instance, a solenoid is used as the engine-halt actuator 13, and there also is used, for easy understanding, a further solenoid as the rotary-speed switchover actuator 6, but it as well is practical to use a motored apparatus type one as shown in FIG. 3.

Thus, the actuator 6 of the motored apparatus type comprises a motor 68, a worm 69, a worm wheel 70 and a half-rotation switchover switch 71. This switch 71 has two separate cooperative pairs of switching contacts 72,73 and 74,75; and these two contact pairs are switched ON and OFF in alteration at every half rotation interval.

Thus, looking in further detail how the operation proceeds, starting from the state shown in FIG. 3 when the relay 44 is energized in such state, then its relay switch 76 is thrown into a normally-isolated contact 77, and there is thus effected the electric supply to the motor 68 through one pair 72,73 of the switching contacts. Hereby, the motor 68 rotates and thus the worm wheel 70 and the switch 71 are caused, via the worm 69, to rotate together. When the switch 71 has made a half rotation, then the one pair 72,73 of the switching contacts com apart and thus break OFF, to therefore cause the motor 68 to halt, while the other pair 74,75 of the switching contacts come to contact. At this time, a connection pin 80 between a link 79 of the link mechanism 54 and the worm wheel 70 has moved from a righthand end to a lefthand end of the worm wheel 70 as seen in FIG. 3, and thus maneuvers the accelerator lever 7 from the low-speed rotation position 9 into the high-speed rotation position 8. Subsequently, as the relay 44 thus breaks OFF, the relay switch 76 in thrown into a normally-open contact 78 and there is thus effected the electric supply to the motor 68 through said other pair 74,75 of the switching contacts. Hereby, the motor 68 rotates, and in the manner similar to the above description, comes to a halt at a point where the worm wheel 70 and the switch 71 has made a half rotation, as said the other pair 74,75 of the switching contacts then come apart. In this meanwhile, the connection pin 80 has moved from the lefthand end to the righthand end of the worm wheel 70 and thus maneuvers the accelerator lever 7 from the high-speed rotation position 8 into the low-speed rotation position 9.

By using this motored apparatus type actuator 6 shown in FIG. 3, it is possible to securely set the accelerator lever 7 into the exact high-speed or low-speed rotation position 8 or 9, since even if there be some small degree of error in the halting position of the connection pin 80 at the lefthand or righthand end of the worm wheel 70, it yet results in quite little left-and-right positional displacement of the actuation link 79. Still further, the worm-gearing speed-reduction mechanism 69,70 contributes, with its driving-force multiplifying function, to realizing the setup with a small-sized motor 68, though the pulling force required to maneuver the accelerator lever 7 against the expanded restoring spring 39 fromt the low-speed rotation position 9 into the high-speed rotation position 8 becomes stronger and stronger as such switching-over process proceeds. Yet more, the worm-gearing speed-reduction mechanism 69,70 functions to lock up the wheel 70 in any rotary position as had forcedly been driven into, even the motor 68 is deenergized, thus then blocking up any reversing rotation even under the urging force of the restoring spring 39; and so the actuator lever 7 as has once been maneuvered into the high-speed rotation position 8 is securely retained in that position 8 without consuming any power for such retention.

Referring back to FIG. 2, a timer circuit 81 is interposed, in parallel manner, in between the ground mass and the base of the transistor 43 of the rotary-speed control circuit 5 or in fact the junction between the base and the output terminal of the load detection apparatus 4. This timer 81 is intended to keep the base of the transistor 43 sufficiently beyond the triggering potential for a certain set retention time, even the load of the load appliance(s) 47 has been released at short-time intervals, thus the work is interrupted at such short-time pitches; therefore to fucntion for preventing the "hunting" phenomenon otherwise to occur, thus the phenomenon such that the actuator 6 in such case repeats frequently making ON and OFF and accordingly that the accelerator lever 7 is similarly switched over between the low-speed and high-speed rotation positions 9,8. This timer 81 is provided with a time setter 82 consisting of a variable resistor, by means of which it is possible to arbitrarily set the retention time so at to properly match the work-interrupting intervals as may vary depending upon the kinds of the work.

A working-rotation retaining switch 95 is interposed, similarly in parallel manner, in between the ground mass and the collector of the transistor 43 or in fact the junction between the collector and the output terminal of the relay 44 of the rotary-speed control circuit 5. This switch 95 is of a manual ON/OFF switchover type, and its setting as manually closed ON causes: the relay 44 to be made ON, thus the actuator 6 to be kept as has moved leftwards, and therefore the engine 1 to be retained in the high-speed rotation regardless of exsistence and absence of the load of the load appliance(s) 47.

By the way, a pivotal support structure of an intermediary lever 83 in the link mechanism 54 is of such make as shown in FIGS. 8(A)(B). FIG. 8(A) shows a state such that the intermediary lever 83 can freely rockingly move, while FIG. 8(B) shows a state such that the intermediary lever 83 is frictionally fixed, as it is sandwichedly compressed by the force of a nut 84 in between a washer plate 85 and a stationary plate 86 which in turn is fixed to the generator 46. These two states can be switched over from each other simply by means of refitting the washer plate 85 while reversingly turning it upside down.

The state of the view A, thus for free rocking movement, is adopted in the case of having the actuators 6,13 control the accelerator lever 7, while the frictionally locked state of the view B is adopted in the case for instance such that there has occurred malfunction of the actuators 6,13, thus they having got incapable of controlling the accelerator lever 7. In this latter state, the accelrator lever 7 is left in the position into thwich it has manually been maneuvered.

Figure 4:
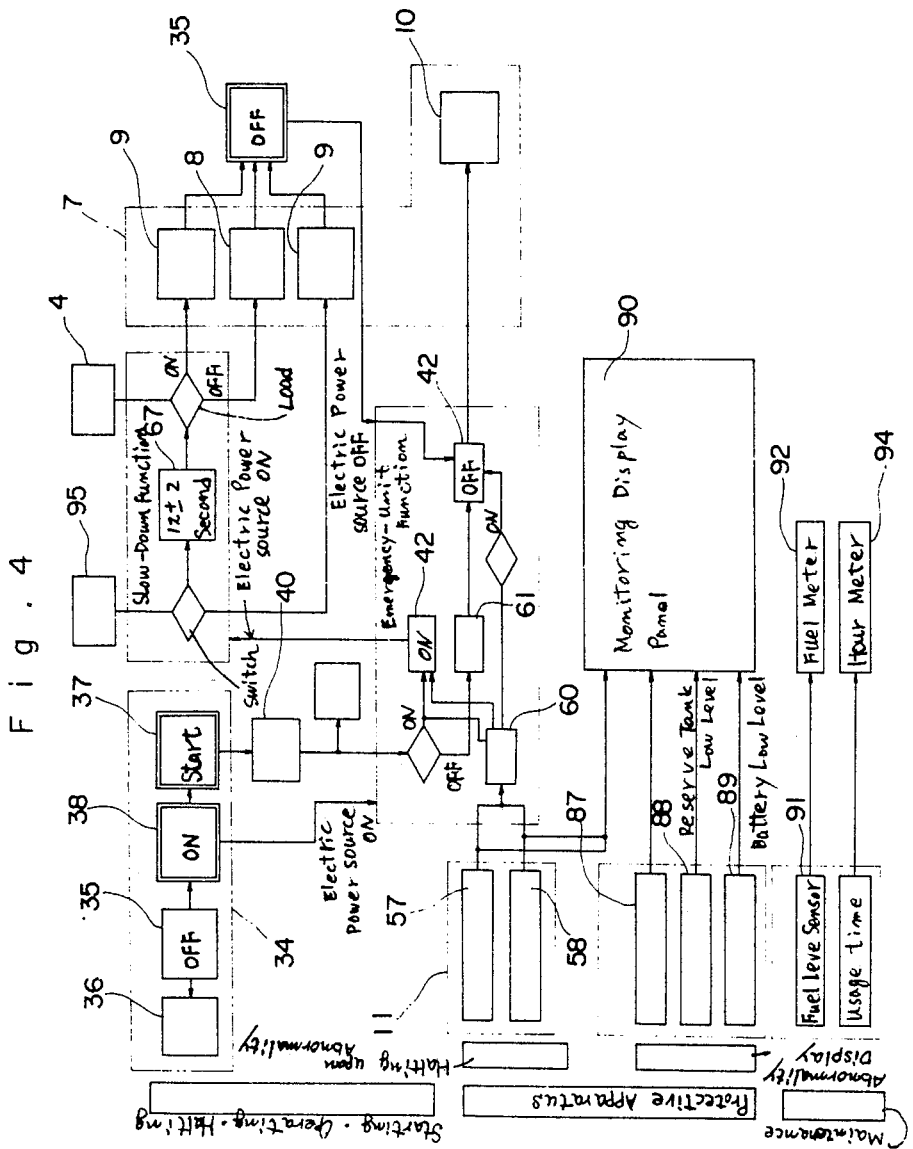
FIG. 4 is a flow chart showing operations of the overall apparatuses.

Function of the apparatuses of the above construction is now described hereunder with reference to FIGS. 2 and 4.

FIG. 2 shows the state with the engine 1 at a standstill. In order to operate the engine 1 starting from this state, the main switch 34 is: first thrown into the preheating position 36 to thereby preheat a combustion chamber by means of a non-illustrated glow plug; then switched over into the starter position 37 to thereby start up the engine 1 by means of an also non-illustrated self-starter; and further switched over ultimatedly into the ON position 38. Describing the operational sequence in more detail since switching over the main switch 34 into the starter position 37, there is then effected the electric supply from the battery 33, via this main switch 34, to the emergent halt control circuit 12 and the rotary-speed control circuit 5, and concurrently therewith there starts the timer 61, and so the transistor 41 of the emergent halt control circuit 12 gets the triggering base voltage through the control input line 64 and thus turns ON and therefore sequentially energizes the relay 42 and the engine-halt actuator 13, thus to thereby maneuver the accelerator lever 7 from the engine-halting position 10 into the low-speed rotation position 9. The transistor 43 of the rotary-speed control circuit 5, receiving here no load detection signals from the load detection apparatus 4 as yet, remains OFF as has so far been, and so the rotary-speed switchover actuator 6 is not energized. Accordingly, the accelerator lever 7 is retained in the state as has been maneuvered into, thus in the low-speed rotation position 9, and in such state the engine 1 is started up by means of the non-illustrated self-starter.

After the starting up, the main switch 34 is switched over into the ON position 38. As the engine 1 thus comes to low-speed operation, the generator 40 accordingly comes to generate electricity for thus supply the power sequentially to the control input line 64 of the emergent halt control circuit 12 and the control input line 66 of the rotary-speed control circuit 5. Hereafter, the timer 61 undergoes the time out and thus breaks OFF. Accordingly, power supply from the battery 33 to both these control input lines 64,66 is hereby blocked up, but the power supply is continued from the generator 40.

Considering here the operation of the rotary-speed control circuit 5, the load detection apparatus 4 emits no load detection signals when there acts no load on the load appliance(s) 47, and so the transistor 43 is then kept OFF. It therefore causes sequentially the relay 44 and the actuator 6 to be retained as deenergized. Accordingly, the accelerator lever 7 is retained in the low-speed rotation position 9, and thus the low-speed operation of the engine 1 is maintained.

In contrast herewith, when there has acted the load, the transistor 43 is turned ON by means of the load detection signal as is then emitted from the load detection apparatus 4. It therefore causes sequentially the relay 44 and the actuator 6 to be energized, to thus move this latter leftwards. Accordingly, the accelerator lever 7 is now switched over into the high-speed rotation position 8, and thus the engine 1 is set into the high-speed operation.

As is clear from the above, the engine 1 is automatically set into the low-speed operation whenever substantially load is released, and is also automatically set into the high-speed operation exclusively when there is acting the substantial load.

When it is designed to halt the engine 1, then the main switch 34 is switched over into the OFF position 35. BY this switching over, power supply to both the rotary-speed control circuit 5 and the emergent halt control circuit 12, through their respective power input terminals 62,63, is blocked up. Accordingly, both the actuators 6,13 are now deenergized, and consequently the accelerator lever 7 is switched over into the engine-halting position 10 by means of the restoring spring 39, and therefore the engine 1 comes to a halt.

Supposed up to this point is the state that there is no abnormality to affect the safe and smooth engine operation. If, however, abnormal situation actually occurs during operation of the engine 1, as for instance abnormal lowering down of the lubricant oil pressure or abnormal rising up of the engine cooling-water temperature, then either one of the sensing switching 57,58 of the abnormality detection apparatus 11 makes ON and thus causes the transistor 41 to turn OFF. This has parallel, concurrent two functions: thus on the one hand of breaking OFF the relay 42 of the emergent halt control circuit 12, to therefore deenergize the actuator 13, and on the other hand of breaking OFF the relay 44 of the rotary-speed control circuit 5 as well, to therefore deenergize also the actuator 6. In consequence of such concurrent deenergization of both the actuators 6 and 13, the accelerator lever 7 is in such instance switched over into the engine-halting position 10 by means of restoring spring 39, and thus the engine 1 thereby automatically comes to a halt.

Besides, malfunction of the non-illustrated radiator fan-belt as for instance its breaking damage or loose slacking, directly causes the immediate engine halting, because of the consequent failure of the generator 40 driven by the fan-belt; as has already been described on the occasion of describing the components associated with the starting-up process, more specifically the description of providing the timer 61 adapted to make ON only during the starting up and thus to break OFF upon the starting up.

FIG. 4 shows the provision such that when either an oil pressure sensor 57, a battery-charge sensor 87, an engine-cooling-water liquid level sensor 88 or a battery liquid level sensor 89 detects abnormal lowering down, or else a cooling-water-temperature sensor 58 detects abnormal rising up, such abnormality is then displayed on a monitoring display panel 90; that the remaining amount of the fuel within the fuel tank is detected by means of a fuel level sensor 91 and is desplayed on a fuel meter 92; and further that the accumulative usage or operation time of the engine 1 is displayed on an hour meter 94.

Figure 9:
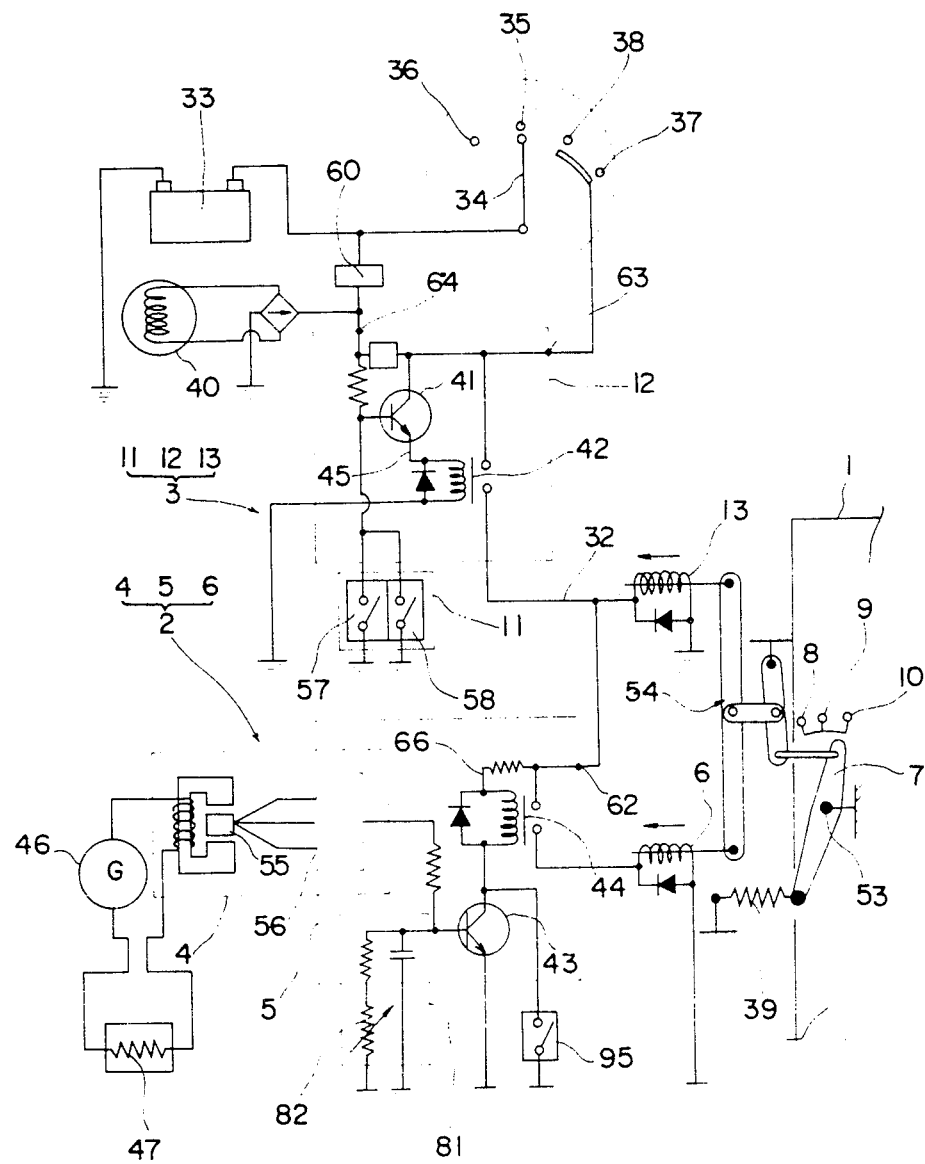
FIG. 9 is a view, corresponding to FIG. 2, of another embodiment.

The primary preferred embodiment of this invention as described hereinabove may practically be modified in various ways, such for instance as follows:

a. Though it has specifically been described to use the motored apparatus type actuator shown in FIG. 3 as the rotary-speed switchover actuator 6, and a solenoid as the engine-halt actuator 13, it as well is possible to construct both the actuators 6, 13 uniformly with either solenoid or else the aforementioned motored apparatus type actuators.

b. Both the actuators 6,13 may be incorporated in a single set of two-stage actuation type solenoid, as to effect the first-step actuation of manuevering the accelerator lever 7 into the low-speed rotation position 9 when only the emergent halt control circuit 12 alone is actuated, and to effect the second-step actuation of maneuvering the accelerator lever 7 into the high-speed rotation position 8 when both the emergent halt control circuit 12 and the rotary-speed control circuit 5 are actuated together.

c. As shown in FIG. 9 which is specifically for this particular modification, the power input terminal 62 of the rotary-speed control circuit 5 is connected to a junction between the output terminal of the relay 42 of the emergent halt control circuit 12 and the input terminal of the engine-halt actuator 13; and to the power input terminal 62 here is connected the control input line 66 of the rotary-speed control circuit 5. Thus, both the control circuit section and the power circuit section of the rotary-speed control circuit 5 is connected to the electric power source 33,40 via the power circuit section of the emergent halt control circuit 12 and the main switch 34.

Describing the function of this modification, there is no substantial differnce from the function of the aforementioned embodiment of FIG. 2, so long as the normal operation is concerned. If abnormal situation occurs, thus either one of the sensing switches 57,58 of the abnormality detection apparatus 11 makes ON, it then causes sequentially the transister 41 and the relay 42 to turn OFF. As has already mentioned hereinbefore, this again has parallel, concurrent two functions: thus on the one hand of deenergizing the engine-halt actuator 13 and on the other hand of breaking OFF the relay 44 thus also deenergizing the rotary-speed switchover actuator 6. In this consequence, the accelerator lever 7 is switched over into the engine-halting position 10 by means of the restoring spring 39, and thus the engine 1 is caused to emergently halt, also just as has already been described.

d. In FIG. 2 or 9, the timer 61 for the starting may be omitted, the result of such omission being that the control input line 64 of the emergent halt control circuit 12 is supplied with electric power from the power source 33,40 throughout the entire period of operating the engine 1, or more specifically while the main switch 34 is thrown into either the starter position 37 or the ON position 38. In this case, the direct connection wire between the control input line 64 and the generator 40 is needless, though it may indifferently be retained as connected.

We claim:

1. In an engine with a rotary-speed control apparatus and an emergency halt apparatus, such that:
the engine (1) is provided with a rotary-speed control apparatus (2) and an emergency halt apparatus (3);
the rotary-speed control apparatus (2) comprises:
   a load detection circuit (4),
   a rotary-speed control circuit (5) and
   a rotary-speed switchover actuator (6),
   which are connected one after another in this sequential order,
and
functions so as to maneuver an accelerator lever (7), by means of the rotary-speed switchover apparatus (6):
   into a high-speed rotation position (8) when the engine (1) is in a state of loaded operation which state is detected by the load detection apparatus (4) and is communicated to the rotary-speed control circuit (5),
   and into a low-speed rotation position (9) when the engine (1) is in a state of no-load operation, which state is detected and communicated in the same manner as mentioned above; and the emergency halt apparatus (3) comprises:
an abnormality detection apparatus (11),
an emergent halt control circuit (12) and
an engine-halt actuator (13),
which are connected one another in this sequential order,
and
functions so as to halt operation of the engine (1) by means of the engine-halt actuator (13), in response to occurence of any abnormality in the engine (1), which occurence is detected by the abnormality detection apparatus (11) and communiccated to the emergent halt control circuit (12);

THE IMPROVEMENT comprising the engine with a rotary-speed control and an emergency halt apparatus, COMPRISING THAT:

a restoring spring (39), the engine-halt actuator (13) and the rotary-speed switchover actuator (6) are interlockedly connected to the accelerator lever (7), in such a manner that the accelerator lever (7) is maneuvered:
into an engine-halting position (10) as is resiliently urged there by means of the restoring spring (39), when both the actuators (6,13) are left deenergized,
into the low-speed rotation position (9), when only the engine-halt actuator (13) alone is energized,
and
into the high-speed rotation position (8), when both the actuators (6,13) are energized together;
the rotary-speed control circuit (5) of the rotary-speed control apparatus (2) is connected to an eletric power source (33) via:
an electric wire (31 or 32) and the emergent halt control circuit (12) of the emergency halt apparatus (3), in such a manner that:
the electric power supply is effected from the power source (33) to the rotary-speed control circuit (5) through the emergent halt control circuit (12),
when the emergent halt control circuit (12) is in the normal actuation state,
thus to retain the rotary-speed control circuit (5) in the actuation state,
the accelerator lever (7) is maneuvered by means of the restoring spring (39), into the engine-halting position (10),
thus to halt the engine (1),
when the emergent halt control circuit (5) is not in the normal actuation state,
on account of then blockingly halting the electric supply from the emergent halt control circuit (12):
on the hant to the engine-halt actuator (13) and on the other hand to the rotary-speed control circuit (5) and therefore also to the rotary-speed switchover actuator (6); and
a control input line (64) of the emergent halt control circuit (12) of the emergency halt apparatus (3) is connected to the power source (33) parallelly via:
an ON position (38) and
a starter position (37) of a main switch (34), in such a manner that the accelerator lever (7) is automatically into the low-speed rotation position (9), when the main switch (34) is maneuvered into the starter position (37) to thus provide the engine-starting state,
on account that:
the emergent halt control circuit (12) then gets electric supply from the control input line (64) and thus energizingly actuates the engine-halt actuator (13), and
the rotary-speed control circuit (5) then gets the electric supply through the emergent halt control circuit (12) but, in view of no load-signal being emitted from the load detection apparatus (4), blocks energization of and therefore halts the rotary-speed switchover actuator (6).

2. The engine of claim 1, wherein at least one out of the rotary-speed switchover actuator (6) and the engine-halt actuator (13) consists of a solenoid.

3. The engine of claim 1, wherein at least one out of the rotary-speed switchover actuator (6) and the engine-halt actuator (13) consists of a motored apparatus.

4. The engine of claim 1, wherein one out of the rotary-speed switchover actuator (6) and the engine-halt actuator (13) consists of a solenoid, while the other consists of a motored apparatus.

5. The engine of claim 4, wherein the rotary-speed switchover actuator (6) and the engine-halt actuator (13) are interlockedly interconnected by means of a link mechanism (54) comprising:
an intermediary lever (83) which is pivotally supported on a stationary pin, and which is operatively connected to the accelerator lever (7),
and
a rod-shaped lever having: one end portion pivotally connected to one said actuator (6),
the other end portion pivotally connected to the other said actuator (13), and
a central portion articulately connected to the intermediary lever (83).

6. The engine of claim 4, wherein:
a timer (61) for the starting is interposed in between:
the control input line (64) of the emergent halt control circuit (12) and
the parallelly connected starter and ON position (37,38) of the main switch (34);
so as to thereby supply the electricity from the power source (33) to the emergent half control circuit (12) and further to the rotary-speed control circuit (5), for a certain set period of time after the main switch (34) is maneuvered into either one of the starter and ON positions (37,38).

7. The engine of claim 1, wherein the rotary-speed switchover actuator (6) and the engine-halt actuator (13) are incorportated in a single unitary set of double-stage actuation type solenoid which function in such a manner as to maneuver the accelerator lever (7):
into the low-speed rotation position (9), as the first stage actuation which is the mode as is induced when only the emergent halt control circuit (12) alone is actuated, and
into the high-speed rotation position (8), as the second stage actuation which is the mode as is induced when both the emergent halt control circuit (12) and the rotary-speed control circuit (5) are actuated together.

* * * * *